(12) United States Patent
Hasegawa et al.

(10) Patent No.: US 7,514,173 B2
(45) Date of Patent: Apr. 7, 2009

(54) WATER-ACTIVATED CELL AND METHOD OF POWER GENERATION

(75) Inventors: Shinji Hasegawa, Ashigarakami-gun (JP); Kentarou Kishi, Ashigarakami-gun (JP); Kei Shimotani, Ashigarakami-gun (JP); Tomoko Miyahara, Ashigarakami-gun (JP); Takashi Morikawa, Ashigarakami-gun (JP); Kazunori Anazawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 547 days.

(21) Appl. No.: 10/992,818

(22) Filed: Nov. 22, 2004

(65) Prior Publication Data

US 2005/0282066 A1    Dec. 22, 2005

(30) Foreign Application Priority Data

Jun. 18, 2004    (JP) .............................. 2004-181155

(51) Int. Cl.
*H01M 6/00*    (2006.01)
*H01M 6/34*    (2006.01)
*H01M 6/32*    (2006.01)
*H01M 6/20*    (2006.01)
*H01M 10/44*   (2006.01)

(52) U.S. Cl. ...................... 429/122; 429/119; 429/118; 429/50; 429/105

(58) Field of Classification Search .............. 264/176.1, 264/219, 340; 428/411.1, 412; 528/176, 528/193, 196, 198, 271, 272; 429/118, 119, 429/50, 105
See application file for complete search history.

(56) References Cited

U.S. PATENT DOCUMENTS

| | | | | |
|---|---|---|---|---|
| 2,967,806 A | * | 1/1961 | Miller et al. | 205/440 |
| 3,368,922 A | * | 2/1968 | Salyer | 429/33 |
| 4,910,102 A |   | 3/1990 | Rao et al. | |

(Continued)

FOREIGN PATENT DOCUMENTS

DE    195 22 226 A1    1/1997

(Continued)

OTHER PUBLICATIONS

"Sea Water Battery," www.yusa-jpn.co.jp/seihin/special/kaisui.html.

(Continued)

*Primary Examiner*—Patrick Ryan
*Assistant Examiner*—Helen O Chu
(74) *Attorney, Agent, or Firm*—Oliff & Berridge, PLC (57) ABSTRACT

A water-activated cell comprises an acidic medium including an acidic substance and having a first electrode disposed therein, a basic medium including a basic substance and having a second electrode disposed therein, which basic medium is disposed adjacent to or near the acidic medium, a first reaction substance including a first active material that causes an oxidation reaction at the first electrode, a second reaction substance including a second active material that causes a reduction reaction at the second electrode, and a water-injecting device for injecting water or an aqueous solution into an area where the acidic medium, the basic medium, the first reaction substance, and the second reaction substance exist together, so as to initiate a discharging reaction by the acidic substance, the basic substance, the first active material, and the second active material.

18 Claims, 4 Drawing Sheets

U.S. PATENT DOCUMENTS

| | | | |
|---|---|---|---|
| 5,006,211 A * | 4/1991 | Paleologou et al. | 204/534 |
| 5,952,119 A * | 9/1999 | Wilson | 429/34 |
| 6,497,973 B1 * | 12/2002 | Amendola | 429/19 |
| 6,608,167 B1 * | 8/2003 | Hayes et al. | 528/271 |

FOREIGN PATENT DOCUMENTS

| | | | |
|---|---|---|---|
| EP | 0592988 | * | 4/1994 |
| FR | 586 921 A | | 4/1925 |

OTHER PUBLICATIONS

Ayato et al., "Characterization of Bipolar Ion Exchange Membrane for Polymer Electrolyte Fuel Cells," Electrochemistry, vol. 71, No. 5, pp. 313-317, 2003.

* cited by examiner

WATER-ACTIVATED CELL AND METHOD OF POWER GENERATION

CROSS-REFERENCE TO RELATED APPLICATION

This application claims priority under 35 USC 119 from Japanese Patent Application No. 2004-181155, the disclosure of which is incorporated by reference herein.

BACKGROUND OF THE INVENTION

1. Field of the Invention

The present invention relates to a water-activated cell having excellent storability and a method of power generation using the same.

2. Description of the Related Art

A cell is a device that converts chemical energy of a substance directly into electric energy. Cells can be classified into primary cells that discharge electric power until their chemical energy is used up, secondary cells capable of being reused by storing chemical energy again by a charging operation after being used up, and fuel cells that obtain electric energy by continually being supplied with a substance having chemical energy from outside. Currently, numerous types of cells have been developed. Each cell has different advantages and disadvantages with respect to each item of environmental safety, economy, amount of electric energy that can be supplied, portability, storage and preservation properties, adaptation to an environment of use, recyclability, and the like, so that cells are selected and put to practical use in accordance with an intended use. Critical technical factors that are common to all cells are what chemical substances are used for reaction, how the reaction is initiated, and in what form the chemical substances are stored.

A cell makes use of two kinds of chemical substances, namely, a reducing agent that causes a reduction reaction (giving electrons to the opposing party or drawing oxygen therefrom) and an oxidizing agent that causes an oxidation reaction (drawing electrons from the opposing party or giving oxygen thereto). By causing these reactions separately at two electrodes that oppose each other, the energy of generated electrons is discharged to the outside (ions produced at the two electrodes accompanying the generation of electrons are neutralized within the cell). Reaction efficiency depends on the kind of the chemical substances to be used, electrode activity, and the condition of reaction fields including electrolytes. Especially, what substances are to be selected to constitute a cell is a point affecting whether the whole cell system will be good or bad not only at the time of use but also at the time of storage and at the time of discarding after use.

For example, in conventional cells such as zinc-manganese system or mercury system primary cells, nickel cadmium secondary cells, nickel hydrogen secondary cells, lithium ion secondary cells, and lead storage cells, the active substances thereof are made of metal. These metallic active substances include lithium which is a flammable dangerous substance, mercury, cadmium, and lead which are substances harmful to the environment, nickel and cobalt which are rare substances that are depletable resources, zinc which is accompanied by high recycling costs, and the like. For these reasons, existing cells involve numerous problems such as the danger of leakage of dangerous substances and environmentally harmful substances, fear of depletion of rare resources, and high costs at the time of recycling.

In addition, since these cells hold liquid electrolytes therein, their active material decrease in amount due to a self-discharging reaction even in a stored state with no outside load imposed. For this reason, existing cells do not have sufficient storability. On the other hand, a sea water cell is commercially available as a cell with enhanced storability. This cell is a primary cell in which silver chloride or lead chloride is used as the positive electrode, and magnesium is used as the negative electrode. The sea water cell is stored in a state without containing an electrolyte solution, and starts to discharge electricity by being immersed in sea water or pure water. This sea water cell can be used as a power source for marine life-saving lamp, a power source for ignition of a detonator, a power source for marine observation equipment, a power source for starting marine-use equipment, a power source for small toys, an emergency power source, or the like purpose (see the Yuasa Corporation website at www.yuasa-jpn.co.jp/seihin/special/kaisui.html). However, since its active material is a metal, there are problems similar to those of the aforementioned primary cells and secondary cells, and a solution to these problems is desired.

Therefore, cell technology providing high storability is earnestly desired. At the same time, a cell technology with less effect on the environment is earnestly desired.

SUMMARY OF THE INVENTION

The present invention has been made in view of the above circumstances. Namely, the invention provides a water-activated cell having a novel construction with sufficient power generation capability and with less decrease in power during storage due to a self-discharging reaction, as well as a method of power generation using the cell.

In addition, in several embodiments, the invention provides a cell by which the problems of conventional cells are solved, such as a water-activated cell which imposes less burden on the environment at the time of storage, at the time of use, at the time of recycling, and at the time of discarding, as well as a method of power generation using the cell.

A first aspect of the invention is to provide a water-activated cell comprising:

an acidic medium including an acidic substance and having a first electrode disposed therein;

a basic medium including a basic substance and having a second electrode disposed therein, the basic medium being disposed adjacent to or near the acidic medium;

a first reaction substance including a first active material that causes an oxidation reaction at the first electrode;

a second reaction substance including a second active material that causes a reduction reaction at the second electrode; and a water-injecting device for injecting water or an aqueous solution into an area where the acidic medium, the basic medium, the first reaction substance, and the second reaction substance exist together, so as to initiate a discharging reaction by the acidic substance, the basic substance, the first active material, and the second active material.

A second aspect of the invention is to provide a method of power generation by injecting water or an aqueous solution into an area where an acidic medium including an acidic substance and having a first electrode disposed therein, a basic medium including a basic substance and having a second electrode disposed therein, which basic medium is disposed adjacent to or near the acidic medium, a first reaction substance including a first active material that causes an oxidation reaction at the first electrode, and a second reaction substance including a second active material that causes a reduction reaction at the second electrode exist together, so as to initiate a discharging reaction by the acidic substance, the basic substance, the first active material, and the second active material.

DETAILED DESCRIPTION OF THE INVENTION

Hereinafter, detailed description will be given regarding a water-activated cell and a method of power generation using the cell according to the present invention.

(Water-activated Cell)

The water-activated cell of the invention includes an acidic medium having a first electrode disposed therein, a basic medium having a second electrode disposed therein, and a reaction substance including an active material (substance for taking out electric energy). The acidic medium and the basic medium are disposed adjacent to or near each other. The acidic medium and the basic medium include an acidic substance and a basic substance, respectively. Further, the cell includes a water-injecting device for injecting water or an aqueous solution into an area where these members exist together, so as to initiate a discharging reaction.

Further, the cell of the invention is a primary cell of bipolar type having a construction equipped with the above-described members. Here, in the invention, a cell of bipolar type refers to a cell having a construction such that an acidic medium and a basic medium are disposed adjacent to or near each other, and these include a reaction substance including an active material for taking out electric energy and electrodes.

Namely, in a water-activated cell of the invention, each member of the acidic medium having the first electrode disposed therein, the basic medium having the second electrode disposed therein, and the reaction substance including the active material (substance for taking out the electric energy) are in a non-reactive state (for example, in a solid form or in a gel form) in a stored state (non-water-injected state) in which no water or aqueous solution is injected. When water or an aqueous solution is injected (water-injected state), the moisture thereof brings the acidic substance, the basic substance, and the active material into a reactive state (for example, in a liquid form), whereby a discharging reaction is started. In other words, the water-activated cell of the invention does not hold a liquid electrolyte within the cell in a stored state, and holds the active substances (acidic substance, basic substance, and active material) in a non-reactive state. For this reason, the self-discharging reaction is unlikely to occur in a stored state in which no water is injected, so that the power does not decrease during storage. Also, the water-activated cell of the invention has a novel construction having a sufficient power generation capability, as will be described later.

Further, in the water-activated cell of the invention, each of the above-described members can be constituted of substances that do not contain a heavy metal (particularly, a harmful heavy metal such as lead, mercury, cadmium, chromium, manganese, or zinc which involve the danger of poisoning), so that the cell imposes less burden on the environment at the time of storage, at the time of use, at the time of recycling, and at the time of discarding.

Here, in a water-injected state, the above-described active materials cause an electrode reaction on the positive electrode side and on the negative electrode side by the following action, thereby enabling efficient generation of electric energy. Namely, unless such an active material coexists with the acidic substance or the basic substance, a cell cannot obtain a sufficient electromotive force.

For example, when the above-described active material coexists with each of the acidic substance and the basic substance, the first active material (which may hereafter be referred to as the first substance) in the acidic substance, accompanied by the hydrogen ions in the acidic substance, causes a reaction (oxidation reaction) that takes away electrons from the first electrode. On the other hand, the second active material (which may hereafter be referred to as the second substance) in the basic substance, accompanied by the hydroxide ions in the basic substance, causes a reaction (reduction reaction) that gives electrons to the second electrode. Namely, the discharging reaction caused by the aforementioned members means an oxidation-reduction reaction.

In particular, in a water-activated cell of the invention in a water-injected state, first, (1) the first substance and hydrogen ions coexist in the aforementioned acidic substance or near the electrode which is in contact therewith, and together cause a reaction (oxidation) of taking away electrons from the first electrode as reactant substances. Further, (2) the second substance and hydroxide ions coexist in the aforementioned basic substance or near the electrode which is in contact therewith, and together cause a reaction (reduction) of giving electrons to the second electrode as reactant substances. Such reactions of (1) and (2) proceed simultaneously to generate the electric energy that drives an outside circuit.

Here, in the cell of the invention in a bipolar-type reaction field, the hydrogen ions constituting a part of the acidic substance participate in the reaction of taking away electrons from the first electrode by the first substance, and the increase in the concentration thereof performs a function of promoting the reaction (shifting the chemical equilibrium in the direction of the product). On the other hand, the hydroxide ions constituting a part of the basic substance participate in the reaction of giving electrons to the second electrode by the second substance, and the increase in the concentration thereof performs a function of promoting the reaction (shifting the chemical equilibrium in the direction of the product). For this reason, the reaction can be reinforced by raising the hydrogen ion concentration or the hydroxide ion concentration, i.e. by lowering the pH in the acidic substance and raising the pH in the basic substance, so that the cell is effective in terms of having a construction that can increase the output.

Hereinafter, each member of the water-activated cell of the invention will be described in detail.

(Acidic Medium and Basic Medium)

The acidic medium includes an acidic substance, and has a form such that, in a stored state, the acidic substance is in a non-reactive state (for example, in a solid form or in a gel form), whereas in the water-injected state, the acidic substance is in a reactive state (for example, in a liquid form (including dissolution)). It is preferable that, in the stored state, the acidic medium is a solid including the acidic substance in view of preventing a self-discharging reaction, and that, due to the dissolution reaction caused by injection of water, the acidic substance is supplied to the reaction field to contribute to the discharging reaction. Namely, the acidic medium preferably produces or releases the acidic substance by injection of water.

Similarly, the basic medium includes a basic substance, and has a form such that, in a stored state, the basic substance is in a non-reactive state (for example, in a solid form or in a gel form), whereas in the water-injected state, the basic substance is in a reactive state (for example, in a liquid form (including dissolution)). It is preferable that, in the stored state, the basic medium is a solid including the basic substance in view of preventing a self-discharging reaction, and that, due to the dissolution reaction caused by injection of water, the basic substance is supplied to the reaction field to contribute to the discharging reaction. Namely, the basic medium preferably produces or releases the basic substance by injection of water.

In the invention, the acidic medium is preferably capable of forming an acidic reaction field in which hydrogen ions constituting a part of the acidic substance having a pH of less than 7 (preferably 3 or less) exist, due to injection of water. Further, the basic medium is preferably capable of forming a basic reaction field in which hydroxide ions constituting a part of the basic substance having a pH of more than 7 (preferably 11 or more) exist, due to injection of water. These acidic medium and basic medium can be used irrespective of whether they are organic compounds or inorganic compounds.

Preferable combinations of the acidic medium and the basic medium include, for example, combinations of phosphorus pentaoxide, oxalic acid, squaric acid, citric acid, or the like with sodium carbonate, potassium carbonate, sodium hydroxide, potassium hydroxide, ammonium compounds, or the like. Further, they include a combination of an acidic ion exchange member (including a form such as a membrane or filter paper using ion exchange resin) having a sulfonic acid group or a phosphoric acid group with a basic ion exchange member having a quaternary ammonium group. Further, they include a combination of a solid super acid such as zirconia oxide treated with sulfuric acid or zirconia oxide containing a noble metal with a solid super base such as barium oxide.

More specifically, the acidic medium preferably includes one or more acids selected from the group consisting of benzenesulfonic acid, alkylbenzenesulfonic acid, phosphorus pentaoxide, hexachloroplatinic acid, citric acid, oxalic acid, salicylic acid, tartaric acid, maleic acid, malonic acid, phthalic acid, fumaric acid, squaric acid, and picric acid. More preferably, the acidic medium includes phosphorus pentaoxide which is a strong acid.

Further, the basic medium preferably includes one or more bases selected from the group consisting of sodium hydroxide, potassium hydroxide, lithium hydroxide, calcium hydroxide, barium hydroxide, magnesium hydroxide, ammonium hydroxide, tetramethylammonium hydroxide, tetraethylammonium hydroxide, tetrapropylammonium hydroxide, and tetrabutylammonium hydroxide, or includes one or more alkali metal salts selected from the group consisting of sodium carbonate, sodium hydrogencarbonate, potassium carbonate, potassium hydrogencarbonate, sodium borate, potassium borate, sodium silicate, potassium silicate, sodium tripolyphosphate, potassium tripolyphosphate, sodium aluminate, and potassium aluminate. More preferably, the basic medium includes sodium hydroxide or potassium hydroxide which is a strong base.

Furthermore, a gelling agent such as anhydrous silicon dioxide, cross-linked polyacrylic acid or a salt thereof, dried agarose, carboxymethyl cellulose, or polyvinyl alcohol may be added to the acidic medium including the acidic substance and to the basic medium including the basic substance such as described above.

Here, the acidic medium and the basic medium may be constituted of one kind or a mixture of two or more kinds selected from the above-described compounds. Also, the way of using the gelling agent is the same as described above.

Further, the aforementioned acidic ion exchange member and basic ion exchange member include a form such as ion exchange membrane, solid polymer electrolyte membrane, or filter paper, using ion exchange resin. Preferable examples thereof include ion exchange members using a strongly acidic ion exchange member having a strong acidic group such as sulfonic acid group or phosphoric acid group or a strongly basic ion exchange member having a strong basic group such as quaternary ammonium group. More specific examples include polyvinylstyrene ion exchange resins represented by DOWEX (trade name, manufactured by Dow Co., Ltd.), DIAION (trade name, manufactured by Mitsubishi Chemical Co., Ltd.), and AMBERLITE (trade name, manufactured by Rohm and Hass Co., Ltd.), polyfluorohydrocarbon polymer solid polymer electrolyte membranes such as NAFION (trade name, manufactured by DuPont Co., Ltd.), FLEMION (trade name, manufactured by Asahi Glass Co., Ltd.), and ASIPLEX (trade name, manufactured by Asahi Kasei Industry Co., Ltd.), polyvinylstyrene ion exchange membranes such as NEOSEPTA (trade name, manufactured by Tokuyama Co., Ltd.) and NEOSEPTA BP-1 (trade name, manufactured by Tokuyama Co., Ltd.), and ion exchange filter paper RX-1 (trade name, manufactured by Toray Co., Ltd.) formed with polystyrene fibrous ionex ion exchanger.

Furthermore, preferable examples of solid superacid include zirconia oxide treated with sulfuric acid and zirconia oxide containing a noble metal. In addition, as solid acid, it is possible to use clay mineral such as kaolinite or montmorillonite, zeolite, composite oxide, hydrated oxide, and activated carbon having an acidic substance deposited thereon.

Preferable examples of solid superbase include barium oxide, strontium oxide, and calcium oxide. In addition, as solid base, it is possible to use metal oxides such as magnesium oxide, and composite oxide containing these, hydroxides having a low solubility to water such as calcium hydroxide, alkali metal or alkali earth metal ion exchange zeolite, and activated carbon having a basic substance deposited thereon.

In the water-activated cell of the invention, it is essential that the acidic medium and the basic medium are disposed adjacent to or near each other. This is to make it possible to hold a balance of charge by allowing a salt to be formed with a counter anion generated by release of a hydrogen ion constituting a part of the acidic substance in the acidic medium and a counter cation generated by release of a hydroxide ion constituting a part of the basic substance in the basic medium. For this reason, if the two media supply a liquid acidic substance and a liquid basic substance by injection of water as described above, for example, it is possible to employ a mode in which the acidic medium and the basic medium are separated from each other by using a separation membrane having a property of transmitting the generated positive ions and/or negative ions therethrough or a salt bridge over which the generated positive ions and/or negative ions can move. Further, the two need not be wholly adjacent to each other, so that the two may be partially adjacent to each other.

(Reaction Substance Including Active Material)

The reaction substance includes an active material, and has a form such that, in a stored state, the active material is in a non-reactive state (for example, in a solid form or in a gel form), whereas in the water-injected state, the active material is in a reactive state (for example, in a liquid form (including dissolution)). It is preferable that, in the stored state, the reaction substance is a solid including the active material in view of preventing a self-discharging reaction, and that, due to the dissolution reaction caused by injection of water, the active material is supplied to the reaction field to contribute to the discharging reaction.

Further, the reaction substance may be the active material itself, or may be a substance that produces or releases the active material due to injection of water (a so-called precursor of the active material).

The reaction substance may be contained in one or both of the acidic medium and the basic medium, or may be disposed adjacent to or near the acidic medium and the basic medium. Thus, since it is sufficient for the reaction substance to be such that the active material contributes to the discharging reaction, the reaction substance may assume a form of being contained in the acidic medium and the basic medium, or may assume a form of being mixed with the acidic medium and the basic medium having a solid form.

Meanwhile, if the active material is to be caused to act in an acidic medium, any active material can be used as long as it is a substance (oxidizing agent) that, accompanied by the hydrogen ions constituting a part of the acidic substance, provokes an oxidation reaction of taking away electrons from the first electrode. On the other hand, if the active material is to be caused to act in a basic medium, any active material can be used as long as it is a substance (reducing agent) that, accompanied by the hydroxide ions constituting a part of the basic substance, provokes a reduction reaction of giving electrons to the second electrode.

Here, as a preferable mode, detailed description will be given by taking, as an example, a configuration including the first substance serving as the first active material that acts in an acidic medium and the second substance serving as the second active material that acts in a basic medium.

The first substance is preferably a substance that promotes the reaction when the hydrogen ion concentration is high. Specifically, one can use hydrogen peroxide, oxygen, hypohalogenous acid such as hypochlorous acid, hypobromous acid, or hypoiodous acid, or the like. Here, these substances may be stored as reaction substances in a solid form or in a gel form, and the first substance may be supplied to the reaction field (to contribute to the discharging reaction) by a dissolution reaction or a chemical reaction that is initiated by injection of water or an aqueous solution.

Further, the second substance is preferably a substance that promotes the reaction when the hydroxide ion concentration is high. Specifically, one can use hydrogen peroxide, hydrogen, hydrazine, or the like. Here, these substances may be stored as solid reaction substances, and the second substance may be supplied to the reaction field (to contribute to the discharging reaction) by a dissolution reaction or a chemical reaction that is initiated by injection of water or an aqueous solution.

Among the above, the first substance and the second substance are preferably made of the same component. Such a substance has a property such that, when in an acidic substance, the substance accompanied by hydrogen ions provokes an oxidation reaction of taking away electrons from the first electrode and, when in a basic substance, the substance accompanied by hydroxide ions provokes a reduction reaction of giving electrons to the second electrode. In this case, the construction of the cell is simple, thereby enlarging the degree of freedom in selecting a separation membrane between chemical substances on the positive electrode side and on the negative electrode side, which has been a great problem in conventional cells. If the acidic substance and the basic substance can be kept in a non-mixed state, the separation membrane is not necessarily needed. Further, a separation membrane capable of transmitting ions can be used as well.

As the substance that can be used both as the oxidizing agent and the reducing agent, hydrogen peroxide is especially preferable. The reason for this will be described in detail later. Further, when the first substance and the second substance are hydrogen peroxide, it is most preferably contained respectively in a molar ratio of 2 (hydrogen ion, hydroxide ion):1 (hydrogen peroxide) relative to the hydrogen ion and the hydroxide ion. This is because it will be understood from the below-described power generation reaction that hydrogen peroxide reacts without shortage or excess when it is contained in the above-mentioned ratio.

Therefore, the first reaction substance including the first substance and the second reaction substance including the second substance are preferably the same substance. Further, the first and second reaction substances are preferably a solid including hydrogen peroxide as the first and second substances, whereby hydrogen peroxide contributes to the discharging reaction by a dissolution reaction due to injection of water.

Here, various compounds can be raised as an example of the reaction substance that produces hydrogen peroxide as the active material by injection of water. In view of the stability of the stored state, the reaction substance is preferably selected from the group consisting of sodium percarbonate, sodium perborate, urea peroxide, and mixtures of these.

According to the water-activated cell of the invention, when hydrogen ions $H^+$ and a hydroxide ions $OH^-$ are involved in the reaction at the electrodes, the first substance that coexists with the acidic substance, accompanied by the hydrogen ions $H^+$, provokes an oxidation reaction of taking away electrons from the first electrode, and the second substance that coexists with the basic substance, accompanied by the hydroxide ions $OH^-$, provokes a reduction reaction of giving electrons to the second electrode. At this time, the electromotive force by oxidation reaction generated in an acidic substance is, in principle, larger than the electromotive force by oxidation reaction generated in a basic substance. This is due to the following reason. Since hydrogen ions $H^+$ are a substance of the reactant, the chemical equilibrium tends to be shifted to the product in a reaction field having a high hydrogen ion concentration, thereby raising the oxidation potential. Also, the electromotive force by reduction reaction generated in a basic substance is, in principle, larger than the electromotive force by reduction reaction generated in an acidic substance. This is due to the following reason. Since hydroxide ions $OH^-$ are a substance of the reactant, the chemical equilibrium tends to be shifted to the product in a reaction field having a high hydroxide ion concentration, thereby lowering the oxidation potential.

For this reason, according to the construction of the bipolar type cell of the invention, the electromotive force generated by the oxidation-reduction reaction at the electrodes is a principal source of the voltage obtained from the cell, so that the cell of the invention can generate electric power more stably than a different bipolar type cell in which the electromotive force is generated principally in an area having a property such that the site where the neutralizing reaction is generated within the cell tends to fluctuate (see Electrochemistry 71, No. 5 (2003) 313-317.).

(First Electrode and Second Electrode)

In the invention, the first electrode is a positive electrode, and the second electrode functions as a negative electrode. As a material for the first electrode and second electrode, it is possible to use a material similar to that of the electrodes in conventional cells. More specifically, the first electrode (positive electrode) may be made of platinum, platinum black, platinum-oxide-coated platinum, silver, gold, or the like. Further, the first electrode may be made of surface-passivated titanium, stainless steel, nickel, aluminum, or the like. Further, the first electrode may be made of a carbon structure such as graphite or a carbon nanotube, amorphous carbon, glassy carbon, or the like. Here, in view of durability, it is more preferable to use platinum, platinum black, platinum-oxide-coated platinum, or a carbon structure.

The second electrode (negative electrode) may be made of platinum, platinum black, platinum-oxide-coated platinum, silver, gold, or the like. Further, the second electrode may be made of surface-passivated titanium, stainless steel, nickel, aluminum, or the like. Further, the second electrode may be made of a carbon structure such as graphite or a carbon nanotube, amorphous carbon, glassy carbon, or the like. Here, in view of durability, it is more preferable to use platinum, platinum black, platinum-oxide-coated platinum, or a carbon structure.

In the invention, the first electrode and the second electrode are preferably plate-shaped, thin-film-shaped, mesh-shaped, or fibrous.

More specifically, as a mesh-shaped electrode, the aforesaid electrode material may be made to adhere to a mesh made of metal, a punching metal plate, or a foamed metal sheet by a nonelectrolytic plating method, a vapor deposition method, or a sputtering method. Alternatively, the aforesaid electrode material may be made to adhere to paper made of cellulose or synthetic polymer by a similar method or a combination thereof.

(Water or Aqueous Solution)

The water or an aqueous solution is not particularly limited as long as it contains moisture. The aqueous solution may be, for example, an aqueous solution of sodium chloride or an aqueous solution of alcohol. Further, the water or an aqueous solution need not particularly be a refined one or a processed one, so that it is possible to use service water or sea water as well. These can be suitably used because they can be obtained easily.

(Water-injecting Device)

The water-injecting device is not particularly limited as long as it can inject water or an aqueous solution into the reaction field where the discharging reaction takes place, and may be constructed with conventional means. Specifically, for example, it is possible to employ a construction in which water or an aqueous solution is injected into the reaction field by a pump, a construction in which water or an aqueous solution is injected into the reaction field by breaking a glass capillary filled with water or an aqueous solution, or a construction in which water or an aqueous solution is injected into the reaction field by mixing a moisture-absorbing agent with the reaction field and letting air flow thereinto to let the moisture-absorbing agent absorb the moisture in the air.

(Preferable Embodiments of the Cell of the Invention)

Figure 2:
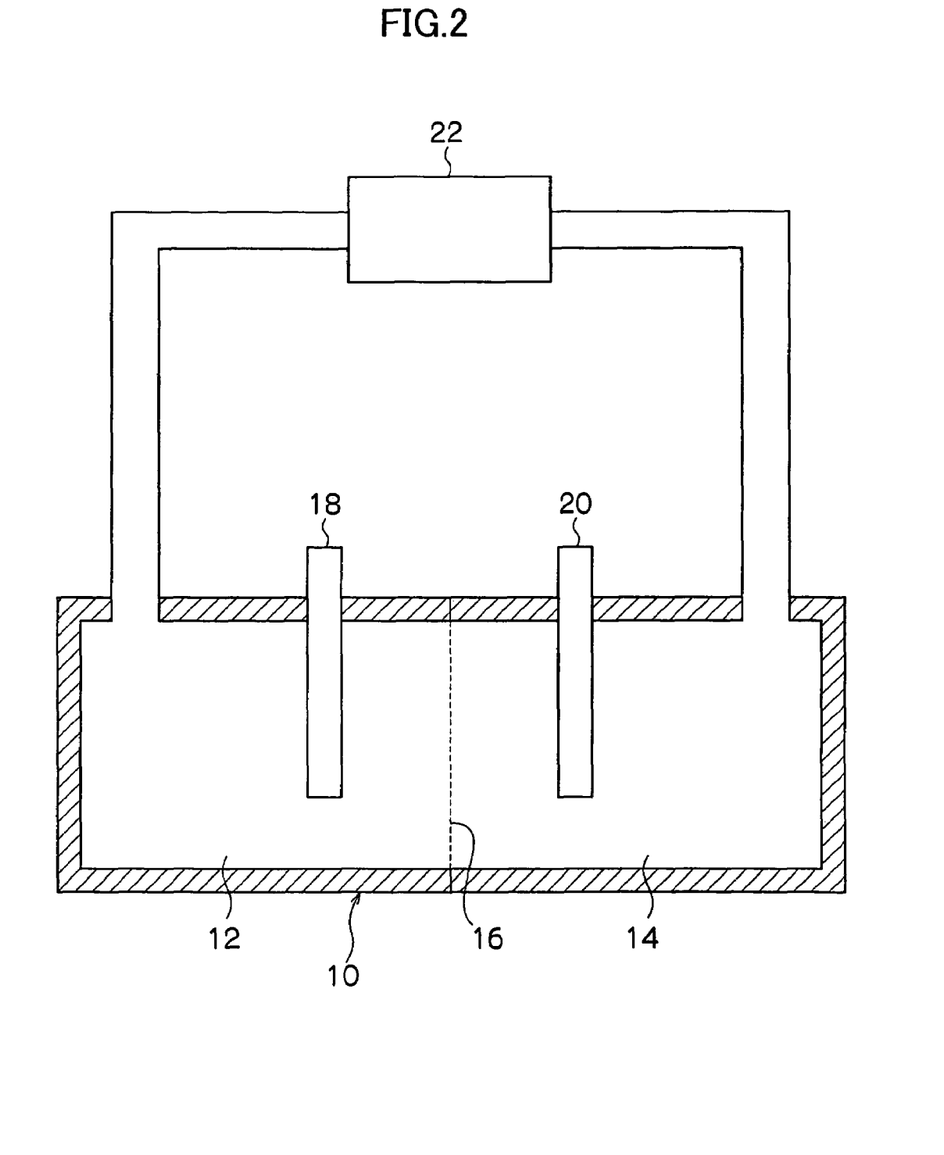
FIG. 2 is a schematic construction view illustrating one example of a preferable embodiment of a water-activated cell according to the invention.

Hereafter, examples of preferable embodiments of the water-activated cell of the invention will be described; however, the invention is not limited to these alone. FIG. 2 is a schematic construction view illustrating one example of a preferable embodiment of the water-activated cell of the invention.

Referring to FIG. 2, the water-activated cell according to this embodiment has a first cell 12 and a second cell 14 in a box 10. The first cell 12 is filled with an acidic medium including an acidic substance and a first reaction substance including a first active material, in a solid form. The second cell 14 is filled with a basic medium including a basic substance and a second reaction substance including a second active material, in a solid form. The first cell 12 and the second cell 14 are separated from each other by a separation membrane 16 that can transmit ions.

Further, a first electrode 18 is disposed in the first cell 12, and a second electrode 20 is disposed in the second cell 14. Thus, a reaction field is formed within the first cell 12 and the second cell 14 (an area where the acidic medium, the basic medium, the first reaction substance, and the second reaction substance exist together).

Then, a water-injecting device 22 is connected to each of the first cell 12 and the second cell 14 so that water or an aqueous solution may be injected into the first cell 12 and the second cell 14.

In the water-activated cell according to this embodiment, when water or an aqueous solution is injected into the first cell 12 and the second cell 14 by the injecting device 22, a dissolution reaction, for example, allows the acidic substance, the basic substance, the first active material, and the second active material to be dissolved in the water or aqueous solution, thereby creating a reactive state where an oxidation-reduction reaction takes place at the electrodes to initiate a discharging reaction.

(Method of Power Generation)

When the water-activated cell of the invention is used and the above-described first active material and second active material are used, the power generation mechanism in the power generation method of the invention is considered to be as described below.

Namely, the first active material contained in the acidic medium, accompanied by hydrogen ions, causes a reaction of taking away electrons from the first electrode, and the second active material contained in the basic medium, accompanied by hydroxide ions, causes a reaction of giving electrons to the second electrode, thereby generating electric power.

By this reaction, the first active material and the second active material undergo a chemical change into plural substances having a lower internal energy, and the energy for that amount is released to the outside as electric energy to generate electric power.

In particular, when the acidic medium supplies an aqueous solution containing an acidic substance and the basic medium supplies an aqueous solution containing a basic substance by injection of water and both of the first active material and the second active material are hydrogen peroxide, the hydrogen peroxide produces water and oxygen by a decomposition reaction. When this chemical reaction is carried out by separating the reaction into an oxidation reaction and a reduction reaction at separate electrodes as in the water-activated cell of the invention, an electromotive force is generated. Namely, hydrogen peroxide, on the one hand, has an oxidizing function in an acidic reaction field and, on the other hand, has a reducing function in a basic reaction field, thereby generating an electromotive force. By using an acid-base bipolar reaction field such as this, the power generation method of the invention is realized.

Figure 1:
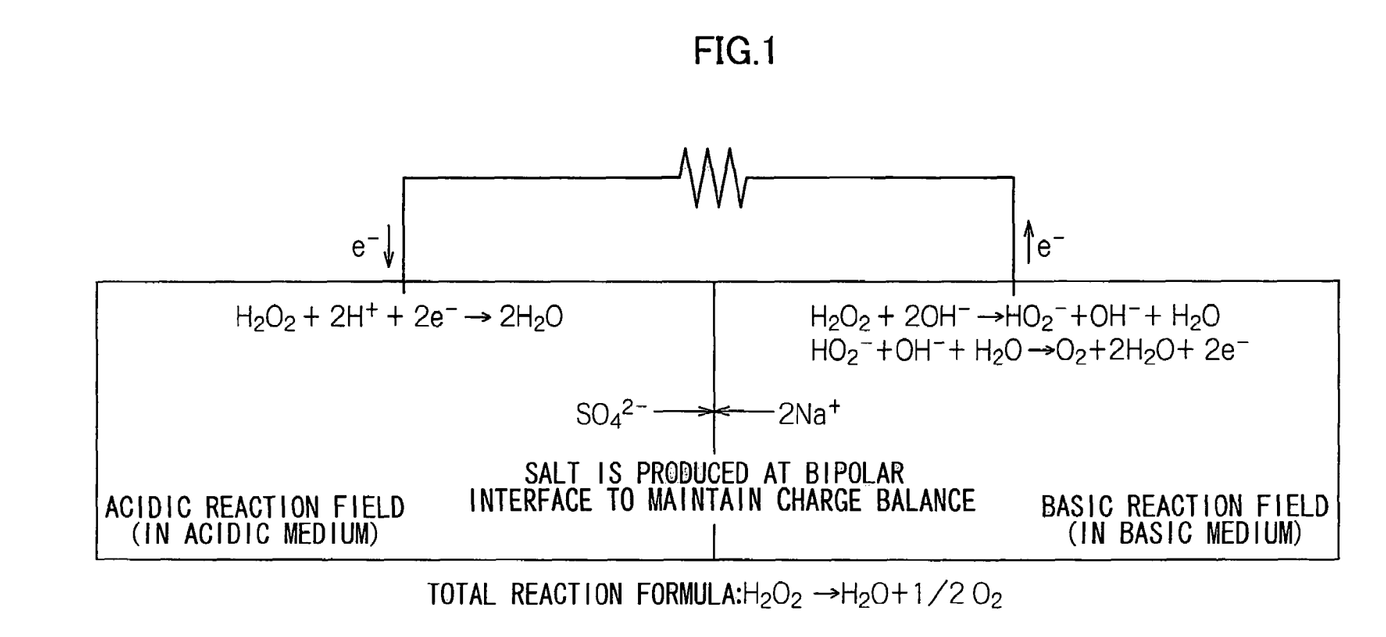
FIG. 1 is a view illustrating a method of power generation in a water-activated cell according to the present invention.

More specifically, the power generation method of the invention will be described with reference to FIG. 1. Referring to FIG. 1, in the acidic reaction field (acidic medium) where the positive electrode (first electrode) is disposed, hydrogen peroxide works as an oxidizing agent and, as shown below (formula 1), the oxygen atoms of hydrogen peroxide receive electrons from the electrode to produce water. Also, in the basic reaction field (basic medium) where the negative electrode (second electrode) is disposed, hydrogen peroxide works as a reducing agent and, as shown below (formulae 2 and 3), the oxygen atoms of hydrogen peroxide give electrons to the electrode to produce oxygen and water. By these reactions, an electromotive force is generated to perform power generation.

(in acidic medium (acidic reaction field))

$$H_2O_2(aq)+2H^++2e^-\rightarrow 2H_2O \qquad \text{(formula 1)}$$

(in basic medium (basic reaction field))

$$H_2O_2(aq)+2OH^-\rightarrow HO_2^-(aq)+OH^-+H_2O \qquad \text{(formula 2)}$$

$$HO_2^-(aq)+OH^-+H_2O\rightarrow O_2+2H_2O+2e^- \qquad \text{(formula 3)}$$

In the above formulas, "(aq)" represents a hydrated state (the same applies to the following (formula 4) as well).

Here, in the reaction fields, the counter anion (corresponding to sulfate ion $SO_4^{2-}$ in FIG. 1) of the hydrogen ion that is present in the acidic medium and the counter cation (corresponding to sodium ion $Na^+$ in FIG. 1) of the hydroxide ion that is present in the basic medium form a salt at the interface of the two media, whereby the balance of charge can be maintained. Since the salt formed at this time is usually more stable when ionized in an aqueous solution, the effect on the electromotive force by formation of the salt is far smaller than that on the electromotive force by the oxidation or reduction reaction at the electrodes. As a result of this, the bipolar type cell of the invention in which the electrode reaction plays a principal role has a property of being capable of performing a more stable power generation than a different bipolar type cell in which the neutralization reaction at the interface of the acidic and basic media plays a principal role (see Electrochemistry 71, No. 5 (2003) 313-317.).

When the balance of charge is maintained by formation of a salt of counter anion and counter cation at the interface of the acidic and basic media, an ion reaction formula obtained by summing up the half reaction formulas of (formula 1), (formula 2), and (formula 3) will be the following (formula 4).

$$H_2O_2(aq)+H^++OH^-\rightarrow 2H_2O+\tfrac{1}{2}O_2 \qquad \text{(formula 4)}$$

According to the thermodynamic calculation, the enthalpy change ($\Delta H$), the entropy change ($\Delta S$), Gibbs free energy change ($\Delta G$, temperature T: in units of Kelvin (K)) of this reaction will be respectively $\Delta H=-138$ kJ/mol, $\Delta S=128$ J/Kmol, and $\Delta G=\Delta H-T\Delta S=-176$ kJ/mol. Also, the theoretical electromotive force (n is the electron number involved in the reaction, and F is a Faraday constant) and the theoretical maximum efficiency ($\eta$) can be calculated as $E=-\Delta G/nF=1.83$ V, and $\eta=\Delta G/\Delta H\times 100=128\%$. A theoretical feature of this reaction is that the entropy increases due to the hydrogen peroxide decomposition reaction, whereby the sign of $\Delta S$ becomes positive. For this reason, the absolute value of $\Delta G$ will be larger than $\Delta H$, so that the theoretical maximum efficiency exceeds 100%.

Based on the foregoing, the theoretical features in the case of using hydrogen peroxide as the first active material and the second active material in the power generation method of the invention will be described below.

In other fuel cells hitherto known in the art, the amount of entropy change $T\Delta S$, in principle, cannot be used for power generation and is released as heat. On the other hand, in the mechanism of the invention, the increase of the entropy obtained by absorbing heat from the outside can be used for power generation. Also, if the reaction temperature T is higher, the absolute value of $\Delta G$ will be larger, thereby raising the electromotive force.

In a practical cell, the output voltage is determined not solely by the theoretical electromotive force of the ion reaction formula. Overvoltage or the like causes decrease of the voltage and simultaneously generates heat. For example, when unit cells are stacked for integration, or in incorporating the cell into a commercial product, this heat will be a great problem. However, as described above, according to the power generation method of the invention, the heat theoretically can be reused for power generation, raising a possibility that the total heat generation will be smaller.

In the above, a power generation method using hydrogen peroxide as the first active material and the second active material has been described; however, it is substantially the same when other substances (compounds) are used as the two substances, in view of the fact that the oxidation-reduction reaction is provoked on the electrode side.

For this reason, according to the water-activated cell of the invention and the power generation method of the invention, stable power generation can be performed owing to the power generation mechanism thereof.

The water-activated cell of the invention has been described; however, the construction of the invention is not limited to the above-described construction. For example, a cell having the above-described construction can be combined with a conventional cell using hydrogen fuel or methanol fuel, or with an existent primary cell or secondary cell for use as a composite cell.

EXAMPLES

Hereafter, the effect of the present invention will be described by way of Examples; however, the invention is not limited by these Examples.

Example 1

A water-activated cell shown in FIG. 2 is fabricated using the following materials. The cell is fabricated by omitting the water-injecting device 22, because in this experiment water will be manually injected.

Namely, the first cell 12 is loaded with a solid powder made of a mixture of 2.62 g of citric acid monohydrate as an acidic medium including an acidic substance (producing hydrogen ions as the acidic substance by injection of water) and 0.98 g of sodium percarbonate ($Na_2CO_3.1.5H_2O_2$) as a first reaction substance including a first active material (producing hydrogen peroxide as the first active material by injection of water). Further, the second cell 14 is loaded with a solid powder made of a mixture of 1.32 g of sodium carbonate ($Na_2CO_3$) as a basic medium including a basic substance (producing hydroxide ions as the basic substance by injection of water) and 0.98 g of sodium percarbonate ($Na_2CO_3.1.5H_2O_2$) as a second reaction substance including a second active material (producing hydrogen peroxide as the second active material by injection of water). A platinum plate having a surface area of 1.0 cm$^2$ (front surface and back surface: 0.5×1.0 cm) is used as a first electrode 18 and a second electrode 20, and a cellulose membrane for dialysis is used as a separation membrane 16.

The water-activated cell fabricated in this manner is subjected to a power generation experiment under the following condition. Namely, this water-activated cell is connected to an outside resistor of 1 KΩ, and the current flowing at that time and the output voltage are measured by using a digital multimeter (2000 manufactured by KEITHLEY).

Figure 3:
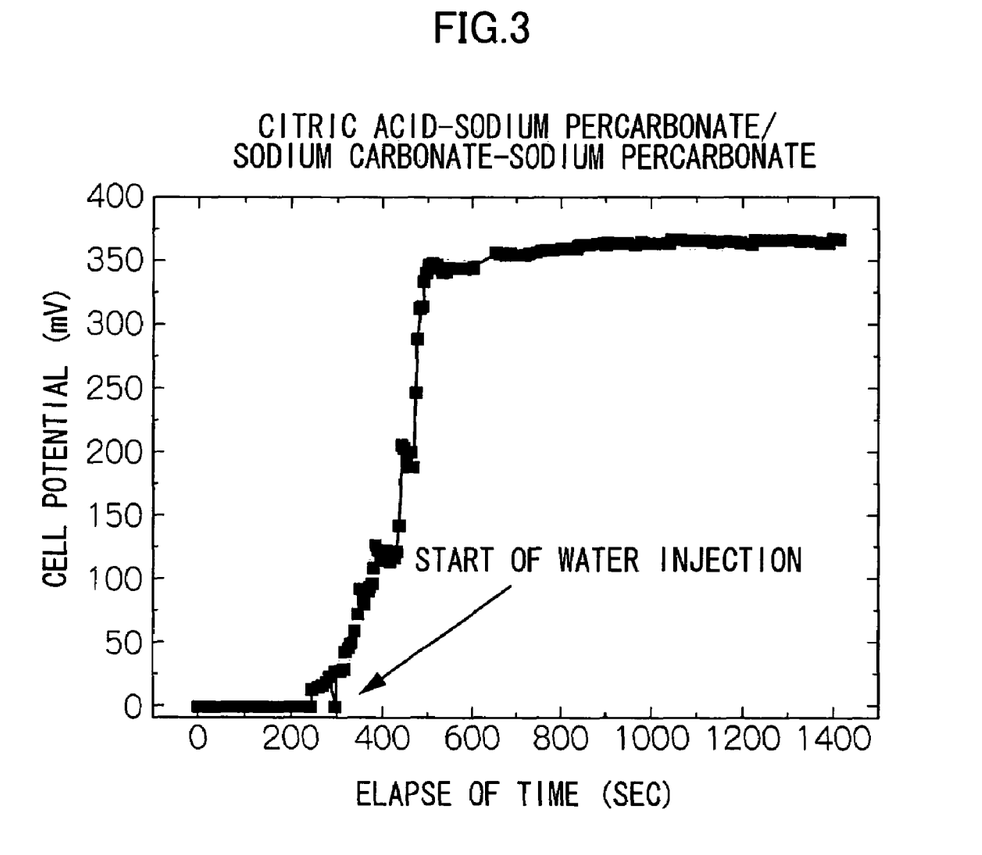
FIG. 3 is a graph showing the dependency of output voltage on the elapse of time in a water-activated cell fabricated in the Examples.

The dependency of the voltage obtained by using the cell under the above-described experiment condition on the elapse of time will be shown in FIG. 3. In FIG. 3, water is not injected yet into the cell at the time of the start of the experiment (elapse of time=0 sec), so that the active substance maintains a solid state and the output voltage of the cell remains to be 0 mV. When the elapse of time is 220 sec, 6 ml of pure water is each injected to the cell. At this time, the concentration of citric acid monohydrate and sodium carbonate is 0.0125 mol/l, and the concentration of sodium percarbonate which is the reaction substance is 0.00625 mol/l. In accordance with the injection of water, the voltage rises and, when the elapse of time is 500 sec, the output voltage of 350 mV is obtained. When the time further passes, the output voltage of 360 mV is maintained. The discharging experiment is stopped when a discharging of one hour or more is confirmed. From such a result, it can be confirmed that the water-activated cell of this Example has a sufficient practicability.

Example 2

Figure 4:
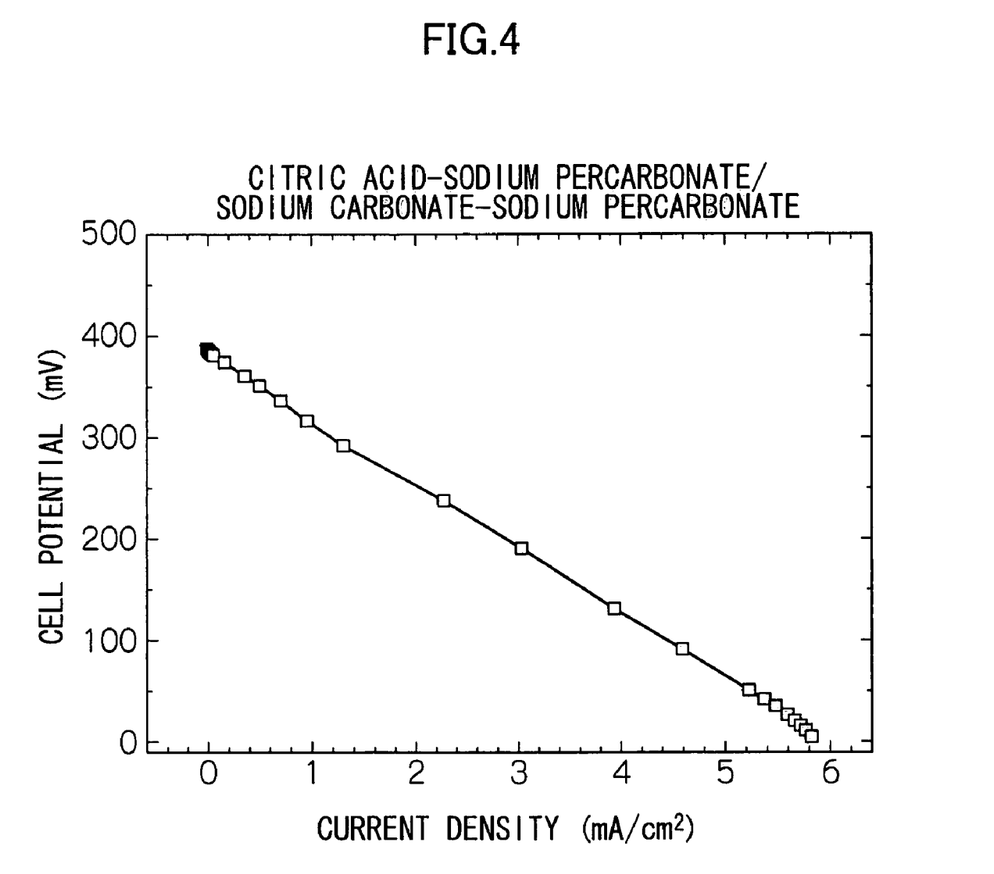
FIG. 4 is a graph showing the results of current-voltage characteristics in a water-injected state in a water-activated cell fabricated in the Examples.

FIG. 4 shows the voltage-current characteristics as measured in a water-injected state using the same water-activated cell as in the above-described Example 1. The open voltage is 400 mV, and the maximum current under no load is 6 mA/cm$^2$. The maximum output density in the water-activated cell of this experiment is 600 μW/cm$^2$ (current density=3 mA/cm$^2$, output voltage=200 mV).

Example 3

The voltage-current characteristics are measured in a non-water-injected state using the same cell as in the above-described Example 2. The voltage is 0 mV, and the current is 0 mA.

Example 4

A water-activated cell having the same construction as in Example 1 is fabricated, and is stored in a non-water-injected state (for one month in a desiccator). After the storage, water is injected by an operation similar to that of Example 1, whereby a result similar to that of Example 1 is obtained.

As described above, in the water-activated cells of the Examples, a good voltage and current is obtained in a water-injected state, as shown in FIGS. 3 and 4. On the other hand, in a non-water-injected state as described in Example 3, the output of voltage and current is zero. Therefore, it has been found out that, according to the cell of the invention having a novel structure and the method of power generation by injection of water, the self-discharging reaction does not occur during the storage, so that the lowering of power is small; and a sufficient electric energy can be supplied at the time of power generation. Further, it has been found out that, since the fabricated cell is constituted of substances that do not contain a heavy metal (heavy metal such as lead, mercury, cadmium, chromium, manganese, or zinc raising a fear of intoxication), so that the cell imposes less burden on the environment at the time of storage, at the time of use, at the time of recycling, and at the time of discarding. In particular, it has been found out that, since hydrogen peroxide is used instead of metal as the active material, less burden is imposed on the environment over the whole life cycle thereof.

Thus, the invention can provide a water-activated cell having a novel construction with sufficient power generation capability and with less decrease in power during storage due to a self-discharging reaction, as well as a method of power generation using the cell. Also, the invention can provide a water-activated cell which imposes less burden on the environment at the time of storage, at the time of use, at the time of recycling, and at the time of discarding, as well as a method of power generation using the cell.

What is claimed is:

1. A water-activated cell comprising:
    an acidic medium including an acidic substance and having a first electrode disposed therein;
    a basic medium including a basic substance and having a second electrode disposed therein, the basic medium being disposed adjacent to or near the acidic medium;
    a first reaction substance including a first active material that causes an oxidation reaction at the first electrode;
    a second reaction substance including a second active material that causes a reduction reaction at the second electrode; and
    a water-injecting device for injecting water or an aqueous solution into an area where the acidic medium, the basic medium, the first reaction substance, and the second reaction substance exist together, so as to initiate a discharging reaction by the acidic substance, the basic substance, the first active material, and the second active material, wherein substantially all hydrogen ions present in the water-activated cell are not derived from inputted hydrogen gas;
    wherein the acidic medium, the basic medium, the first reaction substance and the second reaction substance are each in a solid form or in a gel form in a non-reactive state and are each stored in a non-reactive state.

2. The water-activated cell of claim 1, wherein the first and second reaction substances are contained in one or both of the acidic medium and the basic medium, or are disposed adjacent to or near the acidic medium and the basic medium.

3. The water-activated cell of claim 2, wherein the acidic medium is a solid including the acidic substance, and the acidic substance contributes to the discharging reaction by a dissolution reaction due to the injection of water or an aqueous solution.

4. The water-activated cell of claim 2, wherein the basic medium is a solid including the basic substance, and the basic substance contributes to the discharging reaction by a dissolution reaction due to the injection of water or an aqueous solution.

5. The water-activated cell of claim 1, wherein the first reaction substance including the first active material that causes an oxidation reaction in the acidic medium and the second reaction substance including the second active material that causes a reduction reaction in the basic medium are the same substance.

6. The water-activated cell of claim 5, wherein the first and second reaction substances are a solid including hydrogen peroxide as the first and second active materials, and these active materials contribute to the discharging reaction by a dissolution reaction due to the injection of water or an aqueous solution.

7. The water-activated cell of claim 6, wherein the first and second reaction substances are selected from the group consisting of sodium percarbonate, sodium perborate, urea peroxide, and a mixture of these.

8. The water-activated cell of claim 1, wherein the acidic medium includes one or more acidic substances selected from the group consisting of benzenesulfonic acid, alkylbenzenesulfonic acid, phosphorus pentaoxide, hexachloroplatinic acid, citric acid, oxalic acid, salicylic acid, tartaric acid, maleic acid, malonic acid, phthalic acid, fumaric acid, squaric acid, and picric acid, as the acidic substance.

9. The water-activated cell of claim 1, wherein the basic medium includes one or more bases selected from the group consisting of sodium hydroxide, potassium hydroxide, lithium hydroxide, calcium hydroxide, barium hydroxide, magnesium hydroxide, ammonium hydroxide, tetramethylammonium hydroxide, tetraethylammonium hydroxide, tetrapropylammonium hydroxide, and tetrabutylammonium hydroxide, or includes one or more alkali metal salts selected from the group consisting of sodium carbonate, sodium hydrogencarbonate, potassium carbonate, potassium hydrogencarbonate, sodium borate, potassium borate, sodium silicate, potassium silicate, sodium tripolyphosphate, potassium tripolyphosphate, sodium aluminate, and potassium aluminate, as the basic substance.

10. The water-activated cell of claim 1, wherein the acidic medium includes an acidic ion-exchange member, and the basic medium includes a basic ion-exchange member.

11. The water-activated cell of claim 10, wherein the ion-exchange member is selected from the group consisting of polyvinylstyrene ion-exchange resin, polyfluorohydrocarbon polymer electrolyte membrane, polyvinylstyrene ion-exchange membrane, and fibrous polystyrene ion-exchange filter paper.

12. The water-activated cell of claim 1, wherein the acidic medium or the basic medium contains a gelling agent selected from the group consisting of anhydrous silicon dioxide, cross-linked polyacrylic acid or salts thereof, dried agarose, carboxymethyl cellulose, and polyvinyl alcohol.

13. The water-activated cell of claim 1, wherein the first electrode comprises one or more materials selected from the group consisting of platinum, platinum black, platinum-oxide-coated platinum, silver, gold, surface-passivated titanium, surface-passivated stainless steel, surface-passivated nickel, surface-passivated aluminum, a carbon structure, amorphous carbon, and glassy carbon.

14. The water-activated cell of claim 1, wherein the second electrode comprises one or more materials selected from the group consisting of platinum, platinum black, platinum-oxide-coated platinum, silver, gold, surface-passivated titanium, surface- passivated stainless steel, surface-passivated nickel, surface-passivated aluminum, a carbon structure, amorphous carbon, and glassy carbon.

15. The water-activated cell of claim 1, wherein the first electrode and the second electrode are plate-shaped, thin-film-shaped, mesh-shaped, or fibrous.

16. The water-activated cell of claim 1, wherein the first electrode and the second electrode are formed by using a nonelectrolytic plating method, a vapor deposition method, or a sputtering method.

17. The water-activated cell of claim 1, wherein the water-injecting device, the acidic medium, the first electrode, the second electrode, the basic medium, the first reaction substance, and the second reaction substance of the water-activated cell are constituted of substances that do not contain a heavy metal.

18. A method of power generation by injecting water or an aqueous solution into an area where
   an acidic medium including an acidic substance and having a first electrode disposed therein,
   a basic medium including a basic substance and having a second electrode disposed therein, which basic medium is disposed adjacent to or near the acidic medium,
   a first reaction substance including a first active material that causes an oxidation reaction at the first electrode, and
   a second reaction substance including a second active material that causes a reduction reaction at the second electrode
   exist together, so as to initiate a discharging reaction by the acidic substance, the basic substance, the first active material, and the second active material, wherein substantially all hydrogen ions present are not derived from inputted hydrogen gas;
wherein the acidic medium, the basic medium, the first reaction substance and the second reaction substance are each in a solid form or in a gel form in a non-reactive state and are each stored in a non-reactive state.

* * * * *